United States Patent [19]

Fioretta et al.

[11] 4,130,873
[45] Dec. 19, 1978

[54] AUTOMATIC MACHINE WITH ARTICULATED MECHANICAL ARM

[75] Inventors: Piero Fioretta; Claudio Richiardi, both of Turin, Italy

[73] Assignee: Societa di Elettronica per l'Automazione — SEPA Societa per Azioni, Turin, Italy

[21] Appl. No.: 637,436

[22] Filed: Dec. 3, 1975

[30] Foreign Application Priority Data

Dec. 20, 1974 [IT] Italy .............................. 70716 A/74

[51] Int. Cl.$^2$ ........................................... G06F 15/46
[52] U.S. Cl. ................... 364/513; 214/1 CM; 364/107; 364/115
[58] Field of Search ............... 235/151.11; 340/172.5; 364/118, 100, 107, 101, 102, 114, 115, 120, 513, 200, 900; 214/1 CM; 318/568, 567, 569

[56] References Cited

U.S. PATENT DOCUMENTS

| | | | |
|---|---|---|---|
| 3,525,080 | 8/1970 | Couleur et al. | 340/172.5 |
| 3,654,613 | 4/1972 | Dunne et al. | 235/151.11 |
| 3,771,168 | 11/1973 | Beach et al. | 441/1 |
| 3,872,284 | 3/1975 | Seligman et al. | 340/172.5 |
| 3,920,972 | 11/1975 | Corwin et al. | 235/151.11 M |
| 3,943,343 | 3/1976 | Irie | 235/151.11 |

Primary Examiner—Joseph F. Ruggiero
Attorney, Agent, or Firm—Sughrue, Rothwell, Mion, Zinn and Macpeak

[57] ABSTRACT

An automatic machine of the type having an articulated arm capable of movement with several degrees of freedom, sometimes called a "robot," and having a set of transducers for producing signals representing the movement of the arm when it is manually displaced in an initial "teaching" operation, is provided with a control system including two memories, one conveniently a magnetic tape and the other a magnetic core memory, and an electronic processor or mini-computer which operates to feed data based on the transducer signals representing the actual displacement of the arm in a "teaching" operation, to the tape memory, to process this data into modified data representing a simplified movement based on the significant points of the basic movement, which modified data is ultimately recorded on the core memory for subsequent use in controlling actuators to displace the arm to reproduce the initial movement.

4 Claims, 2 Drawing Figures

AUTOMATIC MACHINE WITH ARTICULATED MECHANICAL ARM

BACKGROUND OF THE INVENTION

The present invention relates to automatic machines, and particularly to automatic machines to the type having moving parts which have more than one degree of freedom and which can be controlled by actuators to perform different movements in accordance with a program stored in a memory of the machine. In one type of such machine the program is fed into the memory by manually displacing the moving parts through the required path to generate, by means of position transducers connected to the parts, signals representing the movements, which signals are recorded in some way in the memory and subsequently used to control the actuators.

One known type of such automatic machine has an articulated mechanical arm movable with several degrees of freedom by a number of actuators. The arm is connected to position transducers the outputs of which feed a memorizing and processing device which can control the actuators. An automatic machine of this type is usually referred to as a "robot".

Known methods for controlling such "robots" comprise a learning stage in which the operator moves the free end of the arm through the required path so as to generate in the position transducers electrical signals in the form of sequential numerical data representing in quantized form the spatial co-ordinates of the sequence of points which constitute the path of the free end of the arm in space, this data being memorized in the memory. The memorized data can then be used to control the actuators to move the arm so that it reproduces the movement it has been "taught" by the initial manual movement. Normally, because of the large amount of information which may be contained in the sequential numerical data representing the movement of the arm, a high capacity memory means, such as, for example, a magnetic tape, is used as the memory.

However, where such a memory is required to be read a large number of times in order to control the robot to repeat its movement a large number of times, there is the disadvantage of heavy wear of the magnetic tape, and this inevitably involves alteration of some of the memorized information, leading to a reduction in the reliability of faithful reproduction of the required path by the free end of the mechanical arm of the robot. The use of more reliable means of memorization, such as magnetic discs, is not convenient from the point of view of economy because of the large amount of information to be recorded in order to represent exactly the path of the arm.

SUMMARY OF THE INVENTION

The object of the present invention is to provide a robot of the type described above, in which the disadvantage of tape wear is overcome, and also to provide a system for controlling such a robot.

According to the present invention there is provided a control system for an automatic machine provided with an articulated mechanical arm movable with several degrees of freedom to cause its free end to describe any selected spatial path, comprising position transducer means sensitive to the position of the arm and operable to produce output signals representing the position of the arm, memorizing and processing means for storing data representing the output signals from the transducers, and thus representing the movement of the arm, and actuator means controllable by signals from the memorizing and processing means to reproduce the movement of the arm memorized therein, of the type in which the data stored in the memory is recorded in a first operating stage during which an operator moves the arm through a required movement and the output signals from the position transducers are stored in the memory as sequential numerical data, characterized in that there are further provided means for processing the data memorized in the memory following the manual handling of the arm so as to generate modified sequential numerical data representing the spatial co-ordinates of the significant points of a line which approximates the said path of the arm, a second memory for memorizing the modified sequential numerical data, and means for controlling the actuators by signals derived from the same modified sequential data stored in the second memory.

It has been established that the sequential numerical data representing the spatial co-ordinates of the path of the free end of the arm, generated and memorized during the learning stage, in fact consist of a plurality of sets of sequential numerical data, each set of data representing the movements of the arm of the robot appropriate to one single degree of freedom. The generation of the modified sequential numerical data and the memorization of the modified sequential data may thus be performed separately on all the sets of data representing individual degrees of freedom.

BRIEF DESCRIPTION OF THE DRAWINGS

One embodiment of this invention will now be more particularly described, by way of example, with reference to the accompanying drawings, in which.

DESCRIPTION OF THE PREFERRED EMBODIMENT

Figure 1:
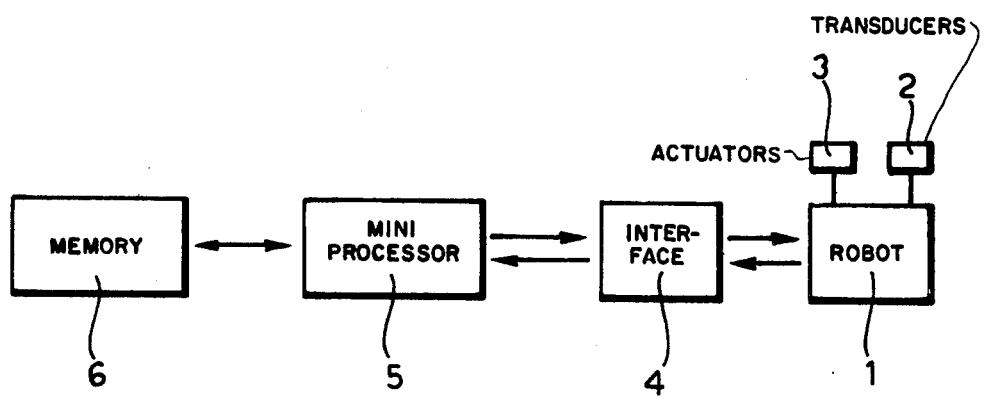
FIG. 1 is a block diagram of a system in accordance with the invention for controlling a robot of the type having a mechanical arm movable with several degrees of freedom.

Referring now to FIG. 1, there is shown a robot 1 having an articulated mechanical arm (not shown) movable with several degrees of freedom so that its free end can describe a spatial trajectory. The arm is connected to position transducers 2, and to actuators 3. The robot 1 is also connected by means of an interfacing circuit 4 to a mini-processor 5, which latter is connected to a memory 6.

The mini-processor 5 used may be, for example, a mini-processor of the type ULP-12, made by FIAT S.p.A., having a central magnetic core memory which can extend to 32 K words of 16 bits. The robot 1 may be, for example, a TRALLFA painting robot having a mechanical arm movable with five degrees of freedom; the memory 6 may be, for example, a magnetic tape recorder of the H7 type, series RCT, produced by REMEX.

The system outlined above operates as follows:

First, the robot must be "taught" the movement required for any operation. For this an operator displaces the free end of the robot's mechanical arm through the required path with the position transducers 2 switched on to produce sequential numerical data representing the spatial coordinates of a sequence of points constituting the path followed by the arm as it is moved by the operator. This information is fed to the memory 6 by the interface 4 and the mini-processor 5, and is stored.

Subsequently the sequential numerical data memorized by the memory 6 following the manual handling of the arm, is processed by the mini-processor 5 so as to generate modified sequential numerical data representing the spatial co-ordinates of a sequence of the significant points of a line which approximates the said path of the free end of the arm. The modified sequential numerical data is then memorized in the central memory of the mini-calculator 5.

When it is desired to control the arm of the robot to move, the mini-processor 5 operates to read and to process the modified data so as to control the actuator means 3 connected to the arm, so that the free end of the arm describes a path which faithfully follows the said approximation line.

Figure 2:
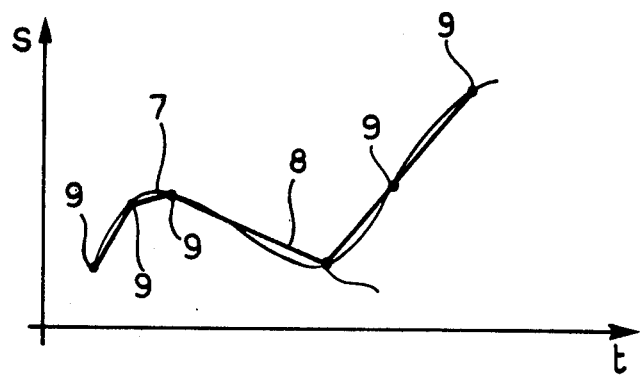
FIG. 2 is a diagram illustrating the movement of the arm of the robot relative to one degree of freedom.

In the learning stage of the procedure, when the arm of the robot is guided manually by the operator who follows a chosen path, the sequential numerical data representing the spatial co-ordinates of the points along the actual path can be considered to comprise a plurality of sets of sequential numerical data, each set of data representing the movements S of the arm of the robot according to one single degree of freedom (curve 7 of FIG. 2). The whole of the sequential numerical data is recorded on the magnetic tape of the memory 6. The said points of the actual path are also acquired in the form of paired numerical values for each degree of freedom.

The acquisition rate is 5 thousandths of a second for each degree of freedom, hence the complete position information for the five degrees of freedom of the mechanical arm of the robot 1 is arrived at every 25 milliseconds. After this initial "learning" stage, the sets of data relative to each single degree of freedom are transferred successively and singly for each degree of freedom from the magnetic tape of the memory 6 to the central memory of the mini-processor 5. The subsequent processing procedure is thus performed separately for each individual degree of freedom.

The sets of data which are present in the central memory of the processor 5 are converted into numerical values so that they can be mathematically processed. This mathematical processing, carried out by the mini-processor 5 generates, for each degree of freedom, a set of modified sequential numerical data representing all the significant points 9 of an approximation line 8, which approximates the actual displacement of the arm as represented by the line 7 of FIG. 2. The sets of modified data, representing the approximation line 8, are transferred back into the memory 6. All the aforesaid operations of the second processing stage are repeated successively for each degree of freedom.

The sets of modified data, representing the various approximations of the displacement of the arm for respective degrees of freedom, now recorded on the magnetic tape memory 6, are then transferred to the central core memory of the mini-processor 5.

When the arm is to be moved by the actuators 3 the mini-processor 5, processing the sets of modified data present in its central memory, reconstructs the approximation line 8 for each degree of freedom and these approximation lines 8 are used, by means of the interface 4, to generate the signals which control the actuators 3 of the robot 1 so that the free end of the arm follows a path which faithfully reproduces the approximation to the initial displacement.

The magnetic tape memory 6 is thus used only during the three learning-processing stages of the operating procedure, whilst only the central core memory of the mini-processor 5 is used during any subsequent operating stage in which the arm of the robot is caused to displace along a path approximately following the initial path through which it was displaced by the operator in the learning stage. If it is wished to vary the precision of the approximation curves, it is not necessary to repreat the whole process, but only the processing stage and the memorizing stage.

We claim:

1. In a control system for an automatic machine of the type having:
   an articulated mechanical arm movable with several degrees of freedom whereby its free end can describe any selected spatial path,
   position transducer means connected to said arm and sensitive to the position of the arm so as to be operable to produce output signals representing the position of said arm,
   a first memory for storing data representing the output signals from said transducer means resulting from the movement of the arm, said data being sequential numerical data representing the spatial coordinates as a timed sequence of points constituting the path followed by the arm, and
   actuator means controllable by signals from said first memory to reproduce the movement of said arm memorized therein, said data stored in said first memory being recorded therein in a first operating phase of said machine during which an operator moves said arm through a required movement and the output signals from said position transducers are stored in said first memory as sequential numerical data;
   the improvement wherein there are further provided:
   processing means for processing said data memorized in said first memory following the manual handling of the said arm, said processing means operating to generate modified sequential numerical data representing the spatial coordinates of the significant points as a function of time of a movement which approximates said movement of said arm through which it is moved by said operator in said first operating phase,
   a second memory for memorizing said modified sequential numerical data, and
   means deriving control signals from said modified sequential data stored in said second memory and for applying said control signals to said actuator means to cause said arm to move through said approximation movement.

2. The control system of claim 1, wherein said sequential numerical data representing the movement of said arm made during said first operating phase consists of a plurality of sets of sequential numerical data, each set of data representing the movement of said arm according to a single degree of freedom, wherein said processing means operates to generate therefrom separate sets of modified sequential numerical data, each set corresponding to an individual degree of freedom, and to record separately in said second memory each said set of said modified sequential data corresponding to an individual degree of freedom.

3. The control system of claim 2, wherein said first memory operates to memorize separately said sets of sequential numerical data relating to the movements of said arm of said machine corresponding to the individual degree of freedom being processed, and each said set of modified sequential numerical data is generated for each degree of freedom individually, all said sets of modified sequential numerical data representing the movements of said arm corresponding to respective degrees of freedom thereof being subsequently memorized in said second memory.

4. The control system of claim 3, wherein said first memory is a tape memory, said processing means and second memory inclues a mini-processor having a central memory, and said processing means records said sets of sequential numerical data representing the movements of said arm of said machine corresponding to respective degrees of freedom on said tape memory sequentially, the set of sequential numerical data first recorded on said tape memory being transferred by said processing means into the central memory of said mini-processor where it is converted into numerical values which can be treated analytically to generate therefrom a set of modified sequential numerical date representing a sequence of significant points of a movement which approximates that movement of said arm which gave rise to said first set of sequential data, this set of modified data then being transferred into said tape memory; this process being repeated for the other sets of sequential numerical data representing the movements of said arm corresponding to the other degrees of freedom thereof, to provide a plurality of sets of modified sequential numerical data recorded on the tape memory, the sets of modified data then being transferred into the central memory of the mini-processor where they can be read by said processing means to provide the output signals required to control said actuators to move said arm through said approximation movement.

* * * * *